Aug. 5, 1969 R. W. ZIEMER ET AL 3,459,205

MAGNETICALLY CONTROLLED FLUID AMPLIFIER

Filed June 28, 1965

INVENTORS
RICHARD W. ZIEMER
MATHEW R. DENISON
BY Allen E. Botney
ATTORNEY 3,459,205
Patented Aug. 5, 1969

3,459,205
MAGNETICALLY CONTROLLED FLUID AMPLIFIER

Richard W. Ziemer, Altadena, and Mathew R. Denison, Tarzana, Calif., assignors to Electro-Optical Systems, Inc., Pasadena, Calif., a corporation of California Filed June 28, 1965, Ser. No. 467,356
Int. Cl. F15c 1/04, 1/08
U.S. Cl. 137—81.5 20 Claims

ABSTRACT OF THE DISCLOSURE

A proportional fluid amplifier using an electrically neutral, electrically conducting fluid such as mercury where the power stream is directed to a selected outlet channel by a non-uniform magnetic field which produces a transverse deflection of the power stream.

Figures 1A, 1B:
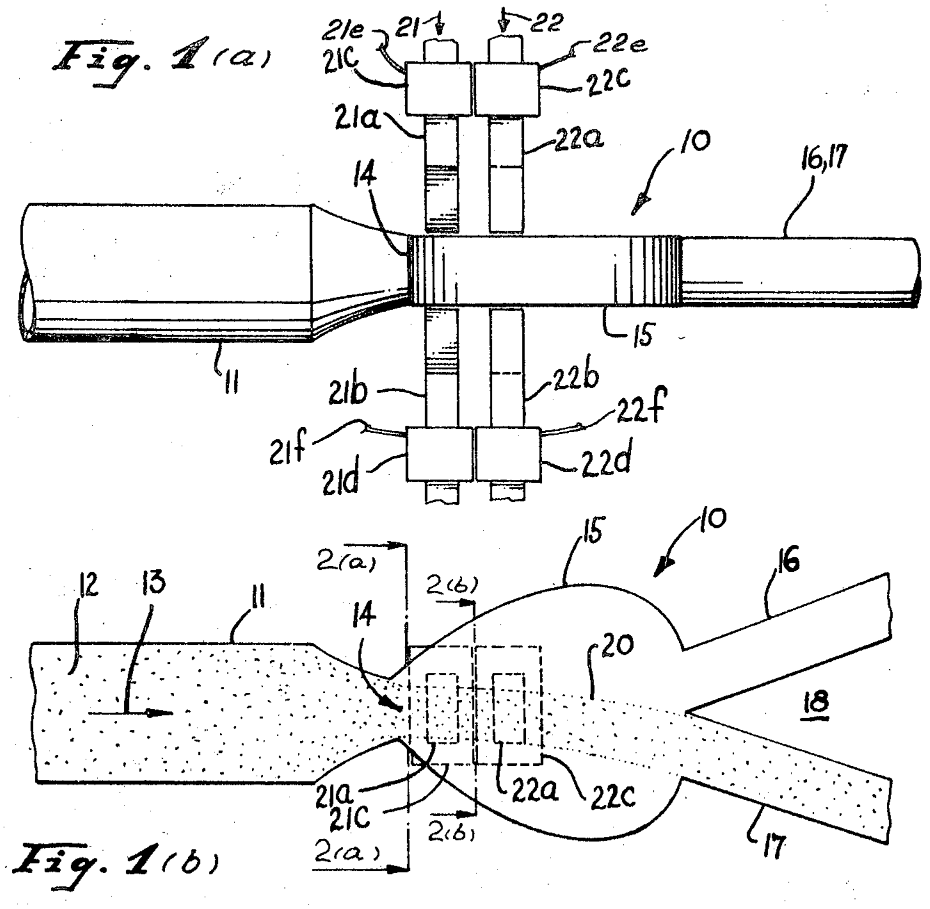

The present invention relates in general to the relatively new technology of fluidics, the term "fluidics" as used herein referring to that field of technology that deals with the use of fluids, either gaseous or liquid, in motion to perform functions such as signal or power amplification, logic or computation, control, and the like. More particularly, the present invention relates to a fluid amplifier system in which electromagnetically induced forces are utilized against the sides of an elongated main fluid stream to control the direction of the stream.

Fluid devices are known wherein a relatively low-energy fluid input is made to impinge upon and thereby deflect a relatively high-energy fluid stream to a selectable outlet. Since the output flow is thus of greater energy than that of the input, these devices have been referred to in the art as "fluid amplifiers." These amplifiers are small, rugged, may be constructed of almost any material, such as plastic, metal, or ceramic, and basically comprise a plurality of fluid ducts or channels formed within substantially solid bodies of material. Moreover, these devices possess the advantages of being inexpensive and requiring no movable solid elements except for the fluid itself.

Fluid amplifiers are basically of two types. One such type is known as the stream interaction or momentum interchange type. In such an amplifier, a power nozzle is supplied with pressurized fluid and thereby issues a high-energy power jet or stream. A control nozzle, on the other hand, directs a jet of low-energy fluid against the side of the power stream to deflect the power stream away from the control nozzle. Momentum is conserved in the system and the power stream will therefore flow at an angle with respect to its original direction such that the tangent of this angle is a function of the momentum of the control jet and the momentum of the power stream. It is thus possible to direct a high-powered fluid stream toward or away from a target area in response to a control jet of lower power. This first type of fluid amplifier is an analog type of device since the degree of deflection of its power stream is proportional to the momentum of its control jet.

A second type of fluid amplifier is known as a boundary layer fluid amplifier and, as will be seen below, this type is a digital type of device because of its bistable or flip-flop nature. More specifically, in this kind of amplifier, the power stream, under the influence of the control jets, locks onto one wall of the amplifier chamber through which it is flowing or the other and, as a result, exits entirely through one or the other of the amplifier's pair of outlet channels. The control jets act as the switching mechanism and by applying these jets selectively onto one side or the other of the power stream, the stream is thereby diverted or switched to the desired outlet channel. As can be seen, the stream maintains a stable position, flowing only to a particular outlet unless it is switched by a control jet, a typical flip-flop action.

As indicated above, the fluid amplifiers utilized in the prior art control the delivery of a first stream of fluid to an outlet channel or utilization device by means of a second fluid that generally issues from a nozzle at right angles to the first jet. Stated differently, fluid amplifiers in the prior art are responsive to fluid control signals for producing fluid output signals. However, it would be desirable in many instances to control fluid amplifiers with electrical signals rather than fluid signals and, to do so, it has been necessary in the past to apply the electrical signals to an electrically-actuated fluid valve. The fluid output signal from the valve is then applied as a fluid control signal input to the fluid amplifier.

It is, therefore, an object of the present invention to provide a fluid amplifier which does not require the use of fluid control signals.

It is another object of the present invention to provide a fluid amplifier having only one fluid input stream called the power stream.

It is a further object of the present invention to provide means responsive to electrical signals of small power to produce larger power fluid signals.

It is an additional object of the present invention to provide electromagnetic means for controlling the flow in a fluid amplifier without the need for an intermediate transducer.

It is still another object of the present invention to enhance the flexibility and versatility of fluid amplifiers by providing electrical actuation of the amplifier in addition to the normal fluid means.

The aforementioned objects are achieved in the present invention by providing the amplifier device with the combination of an electrically-conducting fluid for the power stream and means for electromagnetically deflecting this fluid. More particularly, the deflection is accomplished by the application of an electromagnetic field of such a geometry that the field is transverse to the fluid flow direction and also has a high gradient normal to the flow direction. It is well known that a magnetic field interacts with a moving electrical conductor in a way that the resulting affect is to produce a drag force on the conductor that is proportional to the magnetic field strength. In the present invention, the magnetic field strength being considerably higher at one side of the stream than the other causes a higher drag force on that one side. The resulting asymmetric drag causes a transverse deflection of the stream. Hence, a pressure signal is obtained at the amplifier's output end that is a function of the applied magnetic field strength and, therefore, one that is proportional to the deflection of the stream. Small stream or jet deflections will yield an analog output while a large deflection, yielding a transition from full to no jet capture (or the inverse), will give a digital pressure output. Thus, by means of the present invention, a fluid amplifier, whether it be of the first or the second type described above, can be controlled by an electrical signal acting through an electromagnetic field. Moreover, the electromagnetic control means of the present invention may be used in combination with normal fluid amplifier functions so that control may be accomplished by electric and/or fluid input signals.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the invention.

Figure 2A:
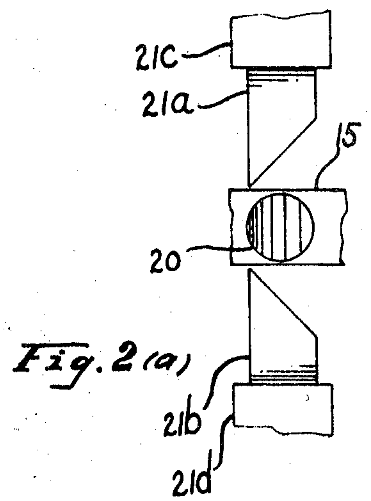
Figure 2B:
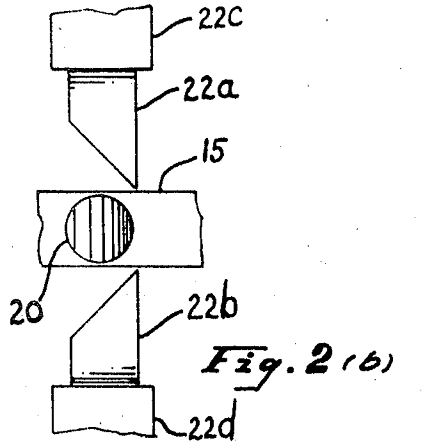

FIGURES 1(*a*) and 1(*b*) are respectively top and front views that diagrammatically illustrate a preferred embodiment of the invention for controlling the flow in a fluid amplifier device;

FIGURE 2(*a*) presents one cross-sectional view of the FIG. 1 device taken along the lines 2*a*—2*a*; and FIGURE 2(*b*) presents another cross-sectional view of the FIG. 1 device taken along the lines 2*b*—2*b*.

For a consideration of the invention in detail, reference is now made to the drawing wherein like or similar parts or elements are given like or similar designations throughout the several figures. However, before proceeding, it should be mentioned that although the first of the above-mentioned fluid amplifiers, namely, the momentum interchange type, was chosen and used herein to describe the invention, both as to its construction and underlying principles, the invention is in reality applicable to both types of amplifiers and should at all times be considered as such. Only one amplifier is being used because the invention is the same as to both and, therefore, it would be unnecessarily redundant to include both.

Accordingly, referring now to the top and front view illustrated in FIGS. 1(*a*) and 1(*b*) respectively, the embodiment is shown to comprise a momentum interchange type of fluid amplifier, generally designated 10, that includes an inlet channel 11 through which a fluid 12 under pressure flows in the direction of arrow 13. The forward end of channel 11 is the constricted area or nozzle 14 which couples or leads channel 11 into a heart-shaped chamber 15 to which the other channels of the amplifier are also coupled. More specifically, connected to chamber 15 at its remote end are two branch or outlet channels 16 and 17 which are made to receive the fluid flow in a manner such that the power stream will pass through the chamber and flow into either of the aforesaid outlet channels, or both, with practically no loss of momentum. In this regard, the outlet channels are arranged to form what may be termed a "fork" consisting of these two outgoing channels separated by a pointed or triangular structure 18 called a "splitter." The splitter is positioned so that if the power stream is not disturbed when it enters chamber 15 and hits the splitter head on, the stream will be divided in two, half the fluid passing into one outlet channel and half into the other.

Turning now to the means for deflecting the power stream, designated 20 in FIG. 1(*b*), to cause it to flow or pass through one or the other of the outlet channels, or to cause it to divide in a desired ratio between them, two pairs or sets of electromagnets are mounted adjacent and orthogonally to chamber 15, one set of electromagnets being generally designated 21 and the other set being designated 22. The pair of electromagnets generally designated 21 comprises a first magnetic pole piece **21*a* positioned on and perpendicular to one side of chamber 15 and also a second magnetic pole piece 21*b* positioned on and perpendicular to the other side of chamber 15**, as is more clearly shown in FIG. 1(*a*). It also includes a pair of coils **21*c* and 21*d* respectively wound on and around pole pieces 21*a* and 21*b*, the input leads for coil 21*c* being designated 21*e* and those for coil 21*d* being designated 21*f*. Similarly, the pair of electromagnets generally designated 22 comprises a first magnetic pole piece 22*a* positioned on and perpendicular to said one side of chamber 15 and also a second magnetic pole piece 22*b* positioned on and perpendicular to said other side of chamber 15. Also included are a pair of coils 22*c* and 22*d* respectively wound on and around pole pieces 22*a* and 22*b*, the input leads for coil 22*c* being designated 22*e* and those for coil 22*d* being designated 22*f***.

As may be seen from an examination of the figures, including FIGS. 2(*a*) and 2(*b*), electromagnets 21 and 22 are parallelly spaced from each other, preferably by as small a distance as possible, and, furthermore, the electromagnets in each set are axially aligned with one another, that is to say, electromagnets **21*a* and 21*b* are positioned in a line that is perpendicular to the side walls of chamber 15 and electromagnets 22*a* and 22*b* are likewise positioned in a line that is perpendicular to the chamber walls. In addition and as may also be noted, the faces of all these pole pieces are tapered, with the tapers of pole pieces 21*a* and 21*b* being in one direction so as to produce a magnetic field in chamber 15 whose gradient varies in one direction and the tapers of pole pieces 22*a* and 22*b* being in a reverse or opposite direction to those of pole pieces 21*a* and 21*b* so as to produce a magnetic field in chamber 15 whose gradient correspondingly varies in a reverse or opposite direction. Stated differently, the pole faces of electromagnets 21 and 22** are tapered in such a manner as to produce gradients in the adjacent magnetic fields that vary in opposite directions across the chamber, with the intensity of one field increasing in going from the bottom to the top of the chamber and the intensity of the other field decreasing in this direction. Thus, referring to FIGS. 1(*a*), 2(*a*) and 2(*b*), the flux density or intensity of the magnetic field between pole pieces **21*a* and 21*b* is greatest toward the bottom of chamber 15 where the respective pole faces are closest to one another and diminishes in proceeding toward the upper part of the chamber where the pole faces are further and further apart from each other. On the other hand, with respect to the magnetic field between pole pieces 22*a* and 22*b*, here the flux density or intensity is greatest at the upper regions of chamber 15** and diminishes in proceeding toward the bottom of the chamber.

The reasons for the magnetic fields and the particular gradients thereof will be better understood from the description of the operation that follows. However, it should be mentioned beforehand, that while amplifier 10 may be made out of any one of a variety of materials, such as plastics, ceramics, metals, etc., if it is made out of metal, it is preferred that it be a non-magnetic type of metal so as not to adversely affect the magnetic fields produced by the electromagnets.

Considering now the operation of the above-described apparatus, a high-energy stream of fluid 12 is pumped into inlet channel 11 at one end and flows through this channel in the direction of arrow 13, and it should be emphasized here that in accordance with the present invention the fluid is one that is electrically conducting. Mercury, sodium, potassium, and liquid metals are but a few examples of the kinds of electrically neutral, electrically-conducting fluids that are available and may be used. As the fluid passes through nozzle 14 to become power stream 20 in chamber 15, it passes in succession between electromagnets 21 and 22. If no direct current is flowing through coils **21*c*, 21*d*, 22*c* and 22*d*, then no magnetic fields exist in chamber 15 so that power stream 20 strikes splitter 18 head-on, with the result that substantially half of the fluid enters and passes through outlet channel 16 and the remaining fluid enters and passes through outlet channel 17. However, if a direct-current voltage is applied to input leads 21*e* and 21*f*, thereby to cause an electrical current to flow in the proper direction through their associated coils, namely, coils 21*c* and 21*d*, a magnetic field having the previously described gradient is established in chamber 15** through which the power stream passes.

As was previously mentioned, it is well known that a magnetic field interacts with a moving electrical conductor in a way that the resulting effect is a drag force on the conductor whose magnitude is proportional to the magnetic field strength. Applying this phenomenon to the present instance, the magnetic field intensity being considerably higher on one side of the power stream than on the other, a much higher drag force is brought to bear on the fluid on that side, the resulting axisymmetric drag thereby causing a transverse deflection of the stream.

More specifically, in the instance under consideration, power stream 20 would be deflected toward outlet channel 16 with the amount of fluid passing through channel 16 depending upon the extent of the deflection which, in turn, is a function of the applied magnetic field strength. On the other hand, if instead of sending a direct-current through coils 21*c* and 21*d*, current was sent through coils 22*c* and 22*d*, then a magnetic field having the oppositely-directed gradient would be established between pole pieces 22*a* and 22*b* so that power stream 20 would now be deflected more towards outlet channel 17. More specifically, in this latter case, the upper part of the power stream would pass through that portion of the magnetic field having the highest intensity and, therefore, the upper part of the stream would experience the greatest drag force. The lower part of the power stream, on the other hand, would receive the smallest drag force, with the result that the power stream as a whole would be turned or deflected toward outlet channel 16.

It should be mentioned once again by way of emphasis that the type of fluid amplifier described herein, namely, the momentum interchange type of amplifier, was used merely to illustrate the features of the invention and not to insinuate or imply in any way or degree that the invention was limited to this kind of amplifier. Thus, it should be understood that the invention is applicable to the boundary layer type of amplifier as well and that such an amplifier is not being described or illustrated herein merely to avoid being unnecessarily redundant. Suffice it to say, therefore, that detailed information relating to the basic construction and operation of boundary layer types of amplifiers is readily available as, for example, that presented in the article by O. Lew Wood and Harold L. Fox entitled "Fluid Computers," published in the November 1963 issue of Science and Technology, pp. 44–52 therein.

Hence, irrespective of the type of amplifier that may be involved, the present invention makes it possible to control the power stream in such an amplifier by means of an electrical signal. Accordingly, the present invention eliminates the need for control jets, which means that the invention makes it possible to provide a fluid amplifier that has only one fluid stream, namely, the power stream. However, embodiments of the invention may nevertheless be used in combination with normal fluid amplifier functions so that control may be accomplished by electric and/or fluid input signals.

Having thus described the invention, what is claimed is:

1. The combination comprising: a fluid amplifier having an input channel through which an electrically-conducting fluid flows in a power stream, a chamber connected to said input channel, and a plurality of output channels connected to said chamber; and control means for controlling the flow of fluid from said input channel to a selected output channel, said control means comprising means for selectively producing in the fluid an asymmetrical, non-uniform magnetic field having a gradient that is transverse to the direction of fluid flow.

2. The combination of claim 1 wherein the non-uniform field varies in intensity from one side of the fluid stream to the other whereby flow to a selected outlet channel is proportional to the strength of the applied magnetic field.

3. The combination of claim 1 wherein the non-uniform magnetic field producing means comprises a first opposed pair of pole pieces on opposite sides of and perpendicular to the plane defined by the flow of the power stream from said input channel to a selected output channel, the faces of said pole pieces being tapered to provide a first magnetic field gradient transverse to the direction of fluid flow, and a second opposed pair of pole pieces on opposite sides of and perpendicular to said plane, the faces of said pole pieces being tapered to provide a magnetic field gradient transverse to the direction of fluid flow and oppositely directed to the gradient of said first magnetic field.

4. The combination of claim 1 wherein said control means are outside and closely adjacent said chamber.

5. The combination of claim 1 further including means to flow an electrically-conducting fluid through said fluid amplifier from said input channel to a selected output channel.

6. The combination of claim 1 wherein the non-uniform magnetic field producing means comprises a pair of pole pieces on opposite sides of and perpendicular to the plane defined by the flow of the power stream from said input channel to a selected output channel, the faces of said pole pieces being tapered to provide the magnetic field gradient transverse to the direction of fluid flow.

7. The combination of claim 6 wherein the tapered pole pieces are positioned such that the edges of said pole pieces most closely adjacent the fluid stream are aligned directly on the opposite side of the fluid stream from each other.

8. The combination of claim 7 wherein the tapers of said pair of opposed pole pieces are oppositely directed to produce oppositely directed gradients.

9. The combination comprising: a fluid amplifier having an input channel through which an electrically-conducting fluid flows in a power stream, a chamber connected to said input channel, and a plurality of output channels connected to said chamber; and control means for controlling the flow of fluid from said input channel to a selected output channel, said control means comprising means for selectively producing a non-uniform magnetic field that varies in intensity from one side of the fluid stream to the other whereby flow to a selected outlet channel is proportional to the strength of the applied magnetic field, said non-uniform magnetic field producing means comprising a pair of pole pieces on opposite sides of and perpendicular to the plane defined by the flow of the power stream from said input channel to a selected output channel, the faces of said pole pieces being tapered to provide a magnetic field gradient transverse to the direction of fluid flow.

10. The combination of claim 9 wherein the tapered pole pieces are positioned such that the edges of said pole pieces most closely adjacent the fluid stream are aligned directly on the opposite side of the fluid stream from each other.

11. The combination of claim 9 wherein the tapered pole pieces are positioned such that the edges of said pole pieces most closely adjacent the fluid stream and the non-tapered surfaces which assist in defining said edges are substantially co-planar.

12. The combination of claim 9 further including a second opposed pair of pole pieces on opposite sides of and perpendicular to said plane, the faces of said pole pieces being tapered to provide a magnetic field gradient transverse to the direction of fluid flow and oppositely directed to the gradient of said first magnetic field.

13. The combination comprising: a fluid amplifier through which an electrically-conducting fluid flows in a power stream to a selected outlet channel; and means for producing a non-uniform magnetic field in the fluid stream that causes an asymmetric drag on said fluid whereby fluid flow to a selected outlet channel is proportional to the strength of the applied magnetic field.

14. In a fluid amplifier device in which a fluid power stream is directed to selected outlet channels, a combination of apparatus for selectively deflecting this stream, said combination comprising: means for flowing an electrically-conducting fluid through said fluid amplifier and means for producing an asymmetrical, non-uniform magnetic field in the stream that has a high gradient normal to the direction of fluid flow thereby producing an asymmetric drag on the fluid.

15. The combination of claim 14 further including additional means for producing a magnetic field in the fluid power stream that has a high gradient normal to the direction of fluid flow, the gradient produced by said additional means being oppositely directed to that produced by said first gradient producing means.

16. Control means for controlling the flow of a power stream in a device having an input channel and a plurality of output channels, said control means comprising: means for producing an asymmetrical, non-uniform magnetic field transverse to the direction of fluid flow, said magnetic field asymmetrically varying in intensity from one side of the fluid stream to the other so that flow to a selected outlet channel is proportional to the applied strength of the magnetic field.

17. The conrtol means of claim 16 wherein the non-uniform magnetic field producing means comprises a pair of pole pieces on opposite sides of and perpendicular to the plane defined by the flow of the power stream from said input channel to a selected output channel, the faces of said pole pieces being tapered to provide the magnetic field gradient transverse to the direction of fluid flow.

18. The control means of claim 17 further including a second opposed pair of pole pieces on opposite sides of and perpendicular to said plane, the faces of said pole pieces being tapered to provide a magnetic field gradient transverse to the direction of fluid flow and oppositely directed to the gradients of said first magnetic field.

19. The control means of claim 17 wherein the tapered pole pieces are positioned such that the edges of said pole pieces most clearly adjacent the fluid stream are aligned directly on the opposite sides of the fluid stream from each other.

20. The combination of claim 19 wherein the tapered pole pieces are positioned such that the edges of said pole pieces most closely adjacent the fluid stream and the non-tapered surfaces which assist in defining said edges are substantially co-planar.

References Cited

UNITED STATES PATENTS

| | | | |
|---|---|---|---|
| 2,952,791 | 9/1960 | Wideroe | 335—210 XR |
| 3,056,069 | 9/1962 | Parain | 335—210 |
| 2,763,125 | 9/1956 | Kadosch et al. | 137—81.5 X |
| 3,071,154 | 1/1963 | Cargill et al. | 137—81.5 |
| 3,071,705 | 1/1963 | Coleman et al. | 103—1 |
| 3,106,058 | 10/1963 | Rice | 103—1 |
| 3,219,851 | 11/1965 | Kidwell | 103—1 |
| 3,266,514 | 8/1966 | Brooks | 137—81.5 |
| 3,302,573 | 2/1967 | Ledeen | 103—1 |

SAMUEL SCOTT, Primary Examiner